N. T. FITCH.
Corn Crib.

No. 70,080. Patented Oct. 22, 1867.

Witnesses.

Inventor.

N. T. FITCH, OF FORSYTH, ILLINOIS.

Letters Patent No. 70,080, dated October 22, 1867.

IMPROVEMENT IN CORN-CRIBS.

*The Schedule referred to in these Letters Patent and making part of the same.*

TO ALL WHOM IT MAY CONCERN:

Be it known that I, N. T. FITCH, of Forsyth, in the county of Macon, and State of Illinois, have invented certain new and useful Improvements in Corn-Cribs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to corn-cribs, and consists of new and certain improvements in the style and form of their construction for securing cheapness, durability, and convenience, as well as for the better preservation of the corn in store, and economy in moving it. In the drawings—

The corn-cribs now in use are generally constructed in a quadrilateral shape, with sills, joists, studs, rafters, and roof, though in the cheaper styles regularly framed sills are dispensed with. As the sides of the cribs made in this way slope very little, and as the bottoms are made flat, they are found to possess many disadvantages. To cover them involves extraordinary expense, and yet if left uncovered the rain will pass through the entire body of corn in the crib to the floor before escaping. When the bottom of the crib is flat, rats and other vermin find a good cover from which to make foraging trips to the corn above. In gathering corn from the field and throwing it into the crib, the earliest gathered, and consequently the least matured, is necessarily placed in the bottom of the crib, and becomes covered up by that later deposited, thus often causing the corn in the bottom to heat and mould. And when the sides are so nearly perpendicular, rain and snow are driven through the spaces left for ventilation when it storms. In the construction of my corn-crib I have sought to overcome these objections.

Figure 1:
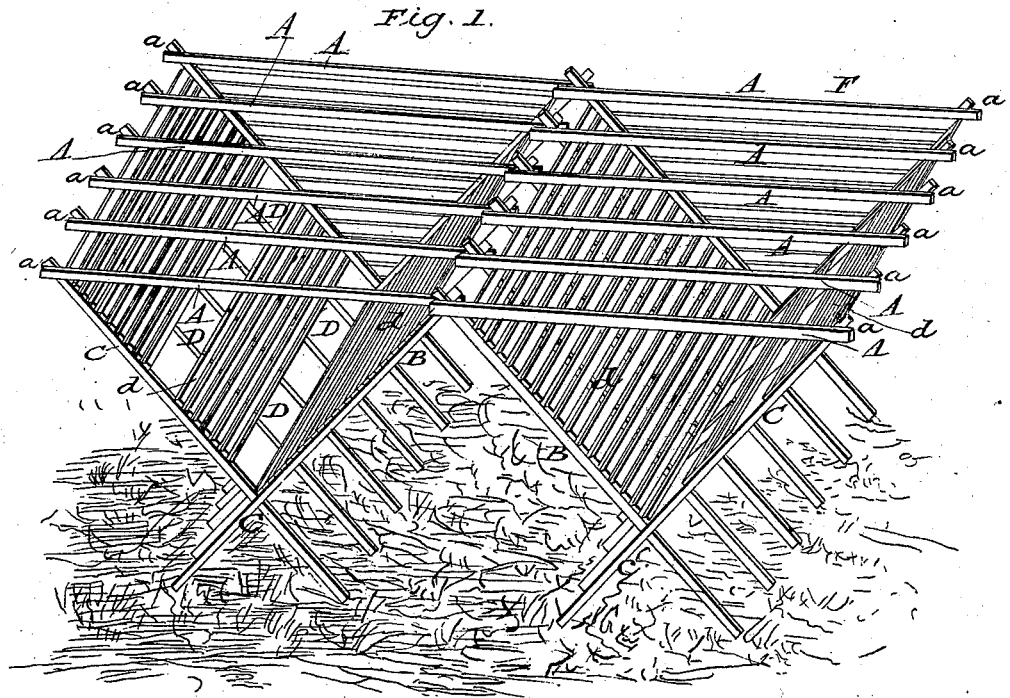
Figure 1 is a perspective view.
Figure 2:
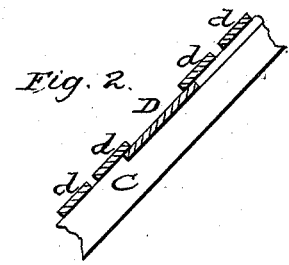
Figure 2 is a transverse vertical sectional view of a portion of one side.
Figure 3:
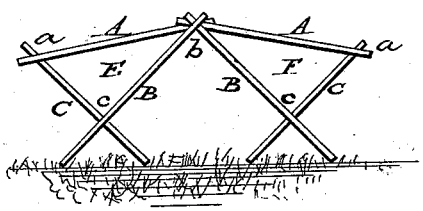
Figure 3 is an end view.

I take two pine joists, A B, two by six, and sixteen feet long, and one, C, of the same dimensions, fourteen feet long, and form them into a triangle, as shown in figs. 1 and 3, and bolt them together at $a$, $b$, and $c$, by means of bolts having nuts to hold them in place. The joist A forms the rafter, and the joists B and C the sides and supports. These I unite so that the rafter A will incline from the point $b$ towards the point $a$. The point of union, $c$, I make sufficiently far from the lower ends of the joists B C to allow these ends to stand far enough apart to support the crib. I then make a series of these triangles of the same size, and in a similar manner, and connect them together by a series of slats, $d$, of six-inch fencing, nailed on the upper edge side of the joists or frame B C, and about one inch apart, as shown in fig. 1. The slats on the joists B, as well as those covering the ends of the crib, extend uniformly from the point where the joists B C cross at $c$ to the top of the crib, as shown in fig. 1. The joists or frame C I do not cover entirely with the slats or siding $d$, but leave a space at the bottom, and one or more spaces between the bottom and the top, in the side, into which I place sliding doors D, as shown in figs. 1 and 2, through which the corn may be conveniently removed from the crib.

While a single crib, E, should be constructed in the manner described, I prefer to construct them double, by bolting the ends of the joists B together at $b$, as shown in figs. 1 and 3, and thus uniting two cribs, E and F. When united in this way the space between them furnishes excellent cover for animals upon the farm, a matter of great importance on prairie farms in the West; and this cover may be made perfect by covering over the rafters A.

Corn-cribs may be constructed in this way of any desired size by using suitable timber for the purpose. When they are made double, and of any considerable length, they should be placed upon planks, so as to keep them level. The top and the sides may be given any slope to suit the taste or desire of the builder. They are simple in their construction, and may be readily put up by any farmer of ordinary skill. When left uncovered the sloping sides allow the rain to pass through without penetrating to the bottom. The sharp angle at the bottom leaves no resting-place for rats or other vermin. The corn first placed in the crib, owing to the angular shape of the bottom, will be less liable to become heated and mould. By means of the sliding doors $d$, the corn can be taken from the crib without any waste. In this way I am able to make a corn-crib at once simple, economical, durable, and convenient, and free from the objections to those made in the ordinary way.

Having thus described my invention, what I claim, is—

The method or plan, substantially as herein described, of constructing corn-cribs, whether the same consist of one single crib or of two or more united, as shown and described.

N. T. FITCH.

Witnesses:
HENRY C. MOWRY,
N. C. HARLAN.